United States Patent

Rousseau

[15] 3,686,438

[45] Aug. 22, 1972

[54] PULSE DISCRIMINATOR

[72] Inventor: Claude Rousseau, Joinville-Le-Pont, France

[73] Assignee: C. I. T. -Compagnie Industrielle des Telecommunications, Paris, France

[22] Filed: June 29, 1970

[21] Appl. No.: 50,404

[30] Foreign Application Priority Data

June 27, 1969 France......................6921829
Dec. 24, 1969 France......................6945005

[52] U.S. Cl..................................178/69.6, 328/118
[51] Int. Cl................................................H04l 11/15
[58] Field of Search.............178/69.6; 328/118, 140; 307/236, 127

[56] References Cited

UNITED STATES PATENTS 2,985,774 5/1961 Carbone et al............328/118
2,820,089 1/1958 Schouten et al..........178/69.6
3,513,255 5/1970 Muller.......................178/69.6

*Primary Examiner*—Kathleen H. Claffy
*Assistant Examiner*—Douglas W. Olms
*Attorney*—Craig, Antonelli & Hill

[57] ABSTRACT

Pulse discriminator device comprising a blocking circuit with a time constant, detecting the appearance of a given polarity, memorizing, during a certain period, the said polarity, and enabling, during that period, the detection of an opposite polarity, a detection and control circuit detecting this opposite polarity and acting on a control circuit which signals, at the output, the detection of this opposite polarity and a maintenance circuit dependent on the control circuit and enabling the first polarity to be kept in the memory while the opposite polarity is being received.

20 Claims, 2 Drawing Figures

PULSE DISCRIMINATOR

Figure 1:
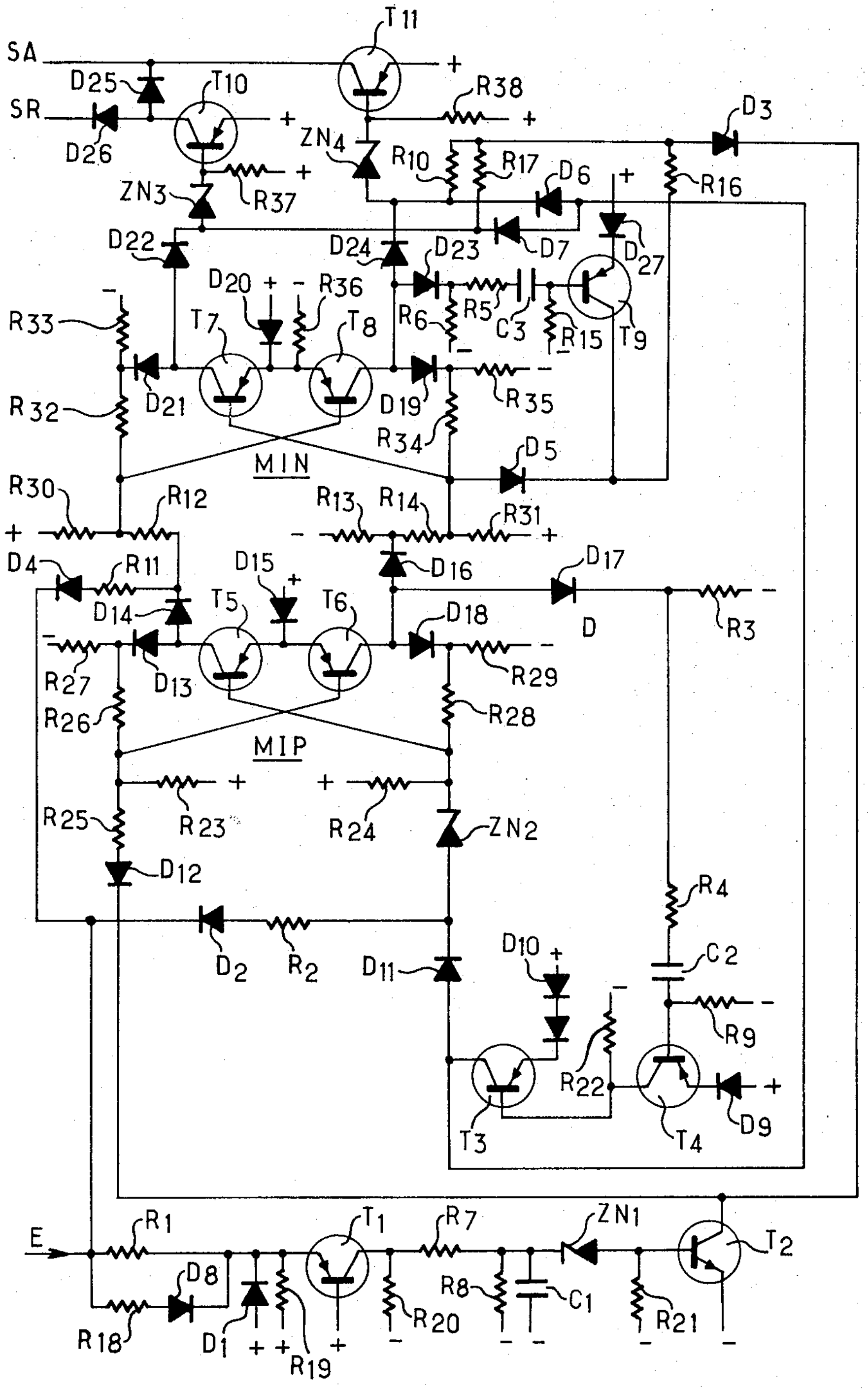

The object of the invention is a pulse discriminator device enabling, more particularly, the identification of a sequence of signals or the discrimination of a call entering according to the polarities which succeed one another in line.

The device according to the invention can be used more particularly in telegraphy in the case of subscriber's equipment having two operating speeds. It is known that certain subscribers have the possibility of using either normal operation at 50 bauds or rapid operation at 200 bauds, though they have only one line between their set and the exchange to which they are connected. It is, however, necessary to recognize immediately the kind of call, so as to prepare adequate establishing of the call, and an appropriate charging rate, as it is possible for the latter to differ according to whether operation is at 50 or 200 bauds.

A discrimination based on the type of line current is effected as soon as a call is received at the exchange; at 50 bauds, the call results in a permanent positive polarity in the wire A, succeeding the permanent negative polarity; at 200 bauds, the call results in a positive polarity on the wire A, lasting 80 milliseconds, followed by a negative polarity lasting 40 milliseconds before the return of the permanent positive polarity.

A discrimination of the incoming call is thus effected according to the type of call and enables the device according to the invention, which comprises one input and two outputs, to obtain either a polarity at only one of the outputs, or a polarity at the two outputs.

It is already known that the (50 or 200 baud) call discriminator device controls directly two relays: the call relay of the line equipment which starts up always only when a call is made, whether the latter operates at 50 or at 200 bauds and the rapid transmission relay which operates only when there is a call at 200 bauds, but when a call is made as well as when a call is received.

Therefore, from the above it follows that:

a. If the calling subscriber's equipment is in normal operation at 50 bauds, only the call relay of the line equipment should operate, this corresponding to a polarity at only one output of the discriminator device according to the invention.

b. If the calling subscriber's equipment is operating at 200 bauds the call relay of the line equipment and the rapid transmission relay should operate, this corresponding to a polarity at each of the two outputs of the discriminator device.

It is known that a telegraph channel crossed by a current in the direction of the transmission characterizes the static or positive state, the opposite direction characterizing the operating or negative state. The calling state is always characterized by a change-over from the negative to the positive, but in the case of the 200 bauds, the positive signal lasting 80 ms is followed by a negative signal lasting 40 ms before the return of the permanent positive polarity.

The device according to the invention is based on a different control of the elements according to whether a signal with a negative polarity or a signal with a positive polarity follows the positive 80 ms pulse.

One characteristic of the device according to the invention is that it provides reliability in the identification of the call; indeed, as nothing at the receiving end differentiates the permanent positive telegraph signal (in the case of 50 bauds) from the 80 millisecond positive telegraphic pulse, the discrimination could be effected only subsequently, by the 40 ms negative pulse consecutive to the 80 ms pulse. It has therefore been assumed that a negative pulse smaller than 20 ms (i.e., smaller than half the normal pulse) would not be counted and would therefore be accepted as an interference, and, consequently, that the call is being made at 50 bauds; in the contrary case, that a negative pulse greater than 20 ms would actually be counted for the discrimination. Furthermore, the outputs of the device have been neutralized during a period of 150 ms, noticeably greater than the sum (80 + 40 ms) of the pulses, to be sure at the moment 150 to have returned to the permanent positive polarity, the figures above given as pulse durations being mere indications.

The device according to the invention is characterized in that it is connected up with the control circuit of the call relay in the subscriber's line equipment, but comes into play only in the case of calls characteristic of call request at 200 bauds, the pulse discriminator being affected but not taking part in the processing of call requests at 50 bauds.

The object of the invention is an electronic device ensuring the detection of the negative pulse of a request for a rapid call and enabling the subscriber's line equipment to memorize it. It controls a discrimination relay when the call is characteristic of a request for a rapid call (positive telegraphic current, permanent negative telegraphic current, permanent positive telegraphic current) and holds the call relay during the negative call or rapid call pulse, the call relay operating on the two types of calls and remaining in the operating position. The discrimination relay is held by a working contact.

The device according to the invention is characterized in that it comprises a clamping circuit with a time constant, detecting the appearance of a given polarity, memorizing that polarity for a certain time and enabling, during that time, the detection of an opposite polarity, a detection and control circuit detecting the said opposite polarity, and acting on a control circuit which signals, at the output, the detection of the said opposite polarity and a holding circuit depending on the control circuit and enabling the first polarity to be memorized while the opposite polarity is being received.

According to a characteristic of the invention, the clamping circuit detecting the appearance of a given polarity comprises a time base circuit including a transistor device which is blocked for a certain time, after the appearance of the given polarity, the detection and control circuit comprising a transistor device which becomes conductive while the opposite polarity is being received, when the latter arrives before the decay of the time constant of the first circuit, the holding circuit comprising a transistor device which becomes conductive while the transistor device of the detection and control circuit is conductive.

According to another characteristic of the invention, the clamping circuit comprises at least a transistor and a time constant circuit CR acting on an electrode of the transistor so that the clamping circuit enables the opposite polarity to arrive in the detecting circuit during a certain time.

In one embodiment of the invention, applied to telegraphy, a positive telegraphic polarity succeeding the negative polarity remains without effect on the control circuit, but, acting on a circuit of the line equipment, enables a positive supply voltage to be applied to the time constant circuit, thus causing the time constant circuit to discharge, and, subsequently, the temporary blocking of the clamping circuit, this blocking being without effect on the other circuits of the device, which remain unexcited.

According to a further characteristic of the invention, a negative polarity being applied to the control circuit during the blocking of the time constant circuit, causes the excitation in series of the detection, control and holding circuits.

According to a characteristic of the invention, the device comprises a circuit for memorizing pulses of a certain polarity, a circuit for memorizing pulses of the opposite polarity, a time base circuit ensuring the identification of the signals received after a certain delay has elapsed and means for preventing parasite pulses from being counted.

According to a characteristic of the invention, as soon as a pulse of given polarity is applied to the device, a time base which counts the total neutralization time of the outputs is initiated.

According to another characteristic of the invention, a first circuit memorizes a positive polarity line pulse on condition that the latter be greater than an accidental pulse, 10 ms, for example. This first circuit consists of a flip-flop having transistors, which goes into a certain state after having received a positive polarity pulse.

According to a further characteristic of the invention, a second circuit memorizes a negative polarity line pulse causing a first state of this second circuit formed by a flip-flop and the consecutive 40 ms negative identification pulse causing a second state of the flip-flop; if the negative pulse is not great enough to be counted, the said circuit returning to its former state, the negative pulse is considered as nil.

According to another characteristic of the invention, the permanent negative line voltage puts the two preceding circuits in their former state.

According to a further characteristic of the invention, a positive telegraphic signal lasting longer than an accidental pulse is received, two input transistors are made conductive, the second of which can discharge a current capable of making the first circuit pass into a second state and, moreover, make the output control transistors conductive.

According to a further characteristic of the invention, the outputs being neutralized, during a determined period, by the time base, only one of the outputs or both the outputs will be polarized, according to the state of the second flip-flop which then controls the state of the outputs.

According to a further characteristic of the invention, the second flip-flop, on going into the second state corresponding to the negative line pulse received, causes the blocking of a transistor; if, during the blocking time, a positive polarity is applied, the negative pulse is cancelled; if, on the contrary, the negative pulse lasts for a normal length of time, this second pulse is counted with a view to identifying the call.

Figure 2:
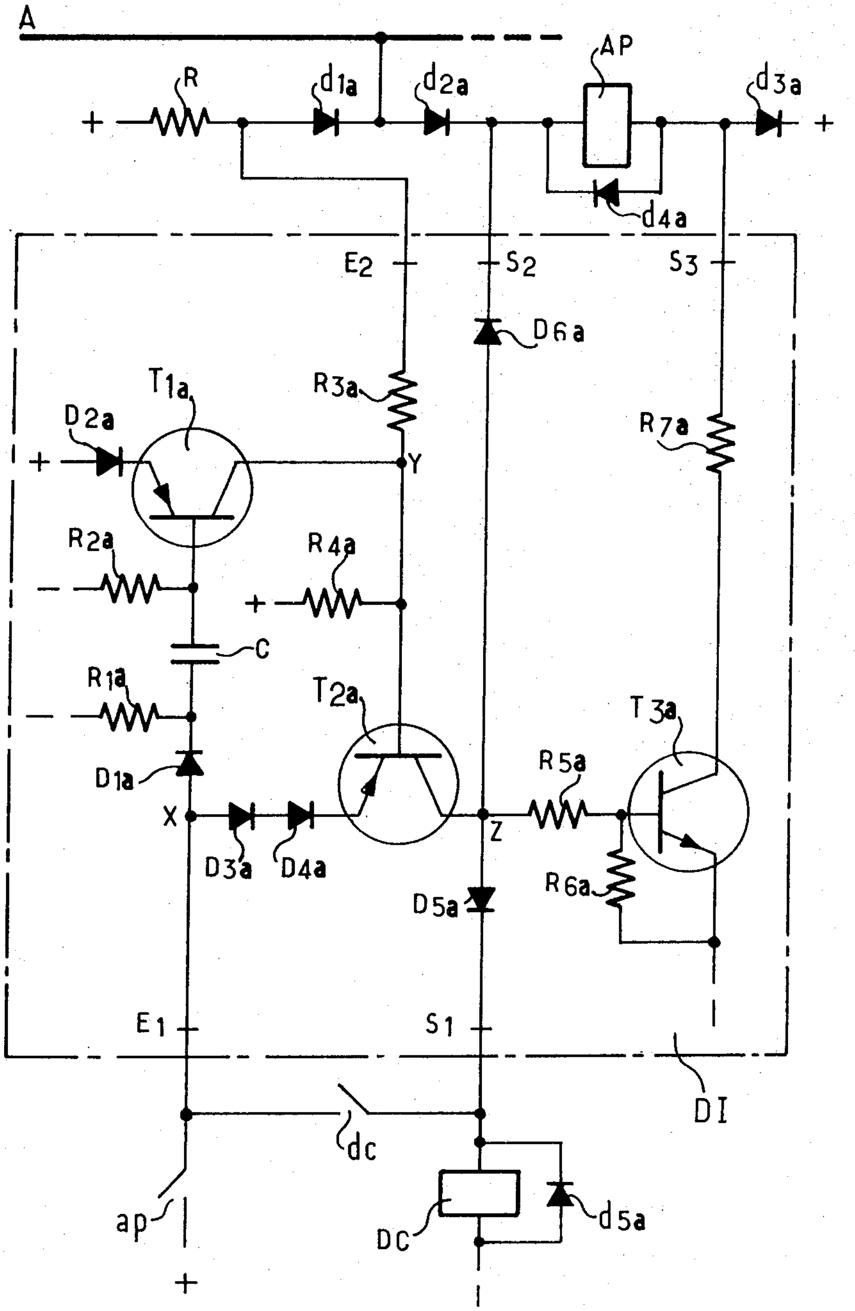

FIGS. 1 and 2 of the annexed drawing show, by way of a non-limiting example, two embodiments of a device according to the present invention.

In the embodiment shown diagrammatically in FIG. 1, the input E of the device forms the receiving end of the channel RON at the exchange to which it is connected; the output SA of the device controls a call relay of the line equipment and the output sr controls a rapid transmission relay with a view to preparing the establishing of the communication at 200 bauds. The device according to the invention consists of several circuits each of which assumes a determined function, these being:

a. A positive polarity detector circuit eliminating positive interference pulses, consisting of transistors $T_1$ and $T_2$ and of a delay circuit: capacitor C1, resistor R7.
b. A time base circuit consisting of transistors T3 and T4 which starts up, after a short delay and prevents all control at the outputs SA and SR for a certain time *t*1.
c. A positive pulse memorizing circuit comprising a bistable flip-flop (MIP) consisting of transistors T5 and T6; it starts up the time base T3–T4 when the positive polarity is applied, and memorizes it, in the case of a call at 200 bauds.
d. A negative pulse memory circuit comprising a bistable flip-flop (MIN) consisting of transistors T7 and T8, in the case of a call at 200 bauds, it memorizes the negative 40 ms pulse.
e. A negative pulse counting circuit consisting of a transistor T9 and a delay circuit, capacitor C3, resistors R5–R15, forming a time base which cancels all negative pulses lasting less than t2 (approximately 20 ms).
f. A control circuit, consisting of transistors T10 and T11, applies a positive polarity, either to wire SA only, in the case of a call at 50 bauds, or to wires SA and SR in the case of a call at 200 bauds.

The duration of the pulses are evidently given only by way of example.

The input E of the device according to the invention is connected to three circuits: the positive polarity detector circuit, the positive pulse memory circuit and the negative pulse memory circuit. In the positive polarity detection circuit, the transistor T1, of the PNP type, is connected to the input E by its emitter across a resistor R1 at whose terminals a resistor R18 and a diode D8, whose cathode has a common terminal with the emitter of T1, are connected up in series. The latter is, furthermore, connected up to the positive polarity, on the one hand, across the diode D1, and on the other hand, across the resistor R19. The base of T1 is connected to the positive polarity. The collector of T1 is connected to the base of the transistor T2, of the NPN type, across the resistor R7 and the Zener diode ZN1, the anode of the latter being connected to the base of T2. The collector of T1 is also connected to the negative polarity across the resistor R20; from the common point at one end of the resistor R7 and of the cathode of ZN1, there are two shunts connected to negative polarities, one consisting of the resistor R8, the other, of the capacitor C1. The base of T2 is also connected to the negative polarity across the resistor R21; the emitter of T2 is directly connected to the negative polarity, whereas the collector of T2 has a common terminal with the diodes D12 and D13.

In the positive pulse memory circuit, the common terminal of the two cathodes D2 and D4 is connected to the input E.

The anode of diode D3 is the common terminal of three branches of the circuits; a first branch is connected to the base of the transistor T7, of the PNP type, across the resistor R16 and the diode D5 in series; a second branch is connected to the base of the transistor T10, of the PNP type, across the resistor R17 in series with the Zener diode ZN3; a third branch is connected to the base of the transistor T11, of the PNP type, across the resistor R10, in series with the Zener diode ZN4.

The emitters of the transistors T5 and T6, of the PNP type, have a common terminal, the latter being connected to the positive polarity across the diode D15.

The base of T5 is connected to a common terminal of the resistors R24 and R28 and of the cathode of the Zener diode ZN2; the other end of R24 is connected to the positive polarity whereas the other end of R28 is connected to the common terminal of the cathode of the diode D18 and of the end of the resistor R29, whose other end is connected with the negative polarity.

The base of T6 is connected to a common terminal of the resistors R23, R25 and R26, whose other ends are connected respectively to the positive polarity, to the anode of the diode D12 and to the common terminal between the cathode of the diode D13 and the resistor R27 whose other end is connected to the negative polarity. The collector of T5 is common to the anodes of the diodes D13 and D14, the cathode of D14 being connected, on the one hand, to the input E across the resistor R11 and the diode D4, and on the other hand, to the base of the transistor T8, of the PNP type, across the resistor R12. The collector of T6 is common to the anodes of the diodes D18, D16, and D17, the cathode of D16 being connected to the common terminal of the resistors R13 and R14, the end of the resistor R13 being connected to the negative polarity, and the end of R14 being connected to the common terminal of the base of the transistor T7, of PNP type, and of the resistor R31 whose other end is at the positive polarity.

The emitters of the transistor T7 and T8 are connected to a common terminal and this common terminal is connected, on the one hand, to the positive polarity across the diode D20, and on the other hand, to the negative polarity across the resistor R36. The collector of T7 is connected, on the one hand, to the common terminal of the resistors R32 and R33 across the diode D21, and on the other hand, to the anode of the Zener diode ZN3 across the diode D22. The collector of T7 is again connected to the negative polarity at the end of the resistor R33. The collector of T8 is connected, on the one hand, to the common terminal of the resistors R34 and R35 across the diode D19, and on the other hand, to two branches of circuits: the first branch connects up the collector of T8 to the anode of the Zener diode ZN4 across the diode D24, and the second branch connects up the collector of T8 and the base of the transistor T9, of the PNP type, across the diode D23 in series with the resistor R5 and the capacitor C3. The anode of the Zener diodes ZN3 and ZN4 are connected to a common terminal respectively across the diodes D6 and D7, and this common terminal is, itself, connected to the collector of the transistor T3. The common terminal of the cathode of D23 and of the resistor R5 is connected to the negative polarity across the resistor R6; the base of T9 is also connected to the negative polarity across the resistor R15. The collector of T9 is connected to the cathode of the diode D5. The emitter of T9 is connected to the positive polarity across the diode D27.

The emitter of the transistor T3 is connected to the positive polarity across the diodes D10; its base is connected to the collector of the transistor T4, of the PNP type, and to the resistor R22, whose other end is at the negative polarity. The emitter of T4 is at the positive polarity across the diode D9, and the base of T4 is connected, on the one hand, to the negative polarity across the resistance R9 and on the other hand, to the plate of the capacitor C2. The other plate of the capacitor C2 is connected across the resistor R4 of the common terminal of the cathode of the diode D17 and of the end of the resistor R3 whose other end is connected to the negative polarity.

The emitter of the transistor T11, of the PNP type, is connected to the positive polarity; its base is also connected, on the one hand, to the positive polarity across a resistor R38, and on the other hand, to the cathode of the Zener diode ZN4. The collector of T11 is directly connected to the output SA of the device.

The emitter of the transistor T10, of the PNP type, is connected to the positive polarity; its base is also connected, on the one hand, to the positive polarity, across a resistor R37, and on the other hand, to the cathode of the Zener diode ZN3. The collector of T10 is connected, on the one hand, to the output SA, across the diode D25, and on the other hand, to the output SR, across the diode D26.

The positive and negative supply voltages mentioned above are those of the standard ±48 volt accumulator of the exchange; they must not be mistaken for the positive and negative polarities of the telegraphic accumulator which are applied to the output E, which are, in actual fact, ±96 volts; the middle point of the telegraphic accumulator being grounded, the telegraphic positive is +48 volts in relation to the positive of the standard accumulator, which is also grounded.

The operation will now be described in the three following cases:

- Operating state characterized by the permanent negative telegraphic voltage on the wire A.
- Call at 50 bauds, characterized by the permanent positive telegraphic voltage succeeding the permanent negative voltage.
- Call at 200 bauds characterized by a positive telegraphic voltage of 80 milliseconds succeeding in a permanent negative voltage and followed by a negative voltage of 40 milliseconds before the return to the permanent positive voltage.

The permanent negative telegraphic voltage at the input E of the device.

The terminal equipment placed at the emitter end of the channel A applies a negative telegraphic voltage to the wire A which is connected to the input E on the circuit consisting of the resistor R1, the diode D1 and the positive supply voltage, as well as across the diodes D2 and D4, as will be seen further on. The potential of the emitter of T1, which is negative in relation to that of the base, holds the transistor T1 in the blocked state.

The transistor T2, being blocked (same potential at the base and the emitter) has no influence, either on the positive pulse memory circuit, consisting of the transistors T5 and T6, or on the transistors T10 and T11 of the control circuit. The outputs SA and SR of the device therefore do not apply any control voltage.

However, a negative telegraphic voltage branch circuit from the input E is connected across the diode D2, the resistor R2, the Zener diode ZN2, the resistor 24 and the positive supply voltage, and applies, to the base of the transistor T5, a potential lower than that of its emitter, so that T5 becomes conductive. Its collector receives a positive potential which blocks the transistor T6 across D13. Another negative telegraphic voltage branch circuit is connected to the input E across the diode D4, the resistor R11, the diode D14 and the positive voltage of the emitter of T5.

The transistor T6 being blocked, as has just been seen, the upper plate of the capacitor C2 is charged with the negative voltage across the resistors R3 and R4 and the positive voltage supplied across the diode D9 and the emitter-base junction of the conductive transistor T4. The potential of the emitter of T4 is applied to the base of the transistor T3 and blocks the latter, whose emitter is connected to the positive voltage across two diodes D10 in series.

As the current crosses the negative voltage circuit, the resistor R13, the resistor R14, the resistor R31 and the positive voltage generates at the base of the transistor T7, a potential smaller than that of its emitter, the voltage drop in the diode D20 being less than the voltage drop in the resistor R31.

The transistor T7 is therefore conductive and blocks the transistor T8 across D21.

The capacitor C3 is charged by the negative voltage, across the resistors R6 and R5 on its left plate, and by the positive voltage on its right plate, across the diode D27 and the emitter-base junction of the conductive transistor T9.

The transistor T2 remaining blocked, the transistors T10 and T11 cannot be conductive, and no control voltage is applied to the outputs SA and SR.

Call at 50 bauds

The call at 50 bauds results in permanent positive voltage at the input E of the device succeeding the permanent negative voltage. This positive telegraphic voltage is applied to the emitter of the transistor T1 across the resistor R1 connected in parallel to the resistor R18 in series with the diode D8; this voltage being higher than the positive supply voltage applied to the base of T1, the transistor T1 becomes conductive. The collector current supplies the delay circuit consisting of the resistors R20, R7 and R8, the capacitor C1 and the Zener diode ZN1. Before the positive voltage is applied, the capacitor is discharged; as soon as the transistor T1 becomes conductive, the capacitor C1 is charged by the positive voltage circuit across the transistor T1, the resistor R7, the capacitor C1 and the negative voltage.

While C1 is charged, the Zener diode ZN1 does not reach its breakdown voltage; it is therefore not conductive, and the transistor T2 remains blocked.

When the voltage at the terminals of the capacitor C1 reaches the value of the breakdown voltage of the Zener diode, the latter being itself at its breakdown voltage, the Zener diode ZN1 becomes conductive and the circuit is completed by T1, R7, ZN1 and R21.

The potential of the base of the transistor T2 being then higher than that of its emitter, T2 becomes conductive. This delay circuit arrangement enables all interference pulses of fairly short duration, e.g., less than 10 milliseconds, to be eliminated.

There is no shunting of the positive telegraphic voltage at the input E, the diodes D2 and D4 being connected up in the wrong direction for this current to pass.

Nevertheless, the transistor T2 being conductive, a circuit is connected via the negative voltage, the transistor T2, the diode D12, the resistors R25 and R23 and the positive voltage. The potential of the base of T6 having a smaller value than that of the emitter, the transistor T6 becomes conductive and discharges or changes state across three circuits in parallel controlled by the diodes D16, D17 and D18.

The positive voltage applied by D18 to the base of T5 across the resistor R28 has the effect of blocking the transistor T5.

The positive voltage applied across D17 on the upper plate of the capacitor C2 causes a change in potential at the base of the transistor T4, having the effect of blocking the latter. T4 is blocked under the control of the delay circuit C2, R4, R9, and the transistor T3 becomes conductive while the discharging of C2 lasts. The circuit across T6, being conductive, slightly modifies the potential at the base of the transistor T7, but without causing the change in state of the flip-flop MIN, where the transistor T7 remains conductive and the transistor T8 remains blocked.

The transistor T3, being conductive, blocks the two transistors T10 and T11 respectively across the diodes D7 and ZN3 and the diodes D6 and ZN4.

Therefore, throughout the discharging of C2, all control is eliminated at the two outputs SA and SR subsequent to the blocking of the transistors T11 and T10; the blocking lasts longer than the total duration of the pulses (80 ms positive + 40 ms negative) corresponding to the minimum identification time of a call at 200 bauds.

When the delay of the circuit C2, R4, R9 has ended, the transistor T4 becomes conductive again, and the transistor T3 becomes blocked again. The line still being positive, the transistor T2 has remained conductive and supplies the transistors T10 and T11 across the diode D3 and the resistors R10 and R17.

Nevertheless, T10 being blocked by the discharge or state of the transistor T7, only the transistor T11 is conductive.

It can be seen that only the output SA receives a positive voltage; this corresponds, indeed, to the case of a call at 50 bauds.

Call at 200 bauds

This call, characterized by a positive pulse at the input E (80 milliseconds, for example) followed by a negative pulse (40 milliseconds, for example) before the return of the permanent positive telegraphic voltage results in a positive voltage at the two outputs SA and SR of the device according to the invention.

As has just been seen in case B previously, with the call at 50 bauds, the supply of the positive telegraphic voltage at the input E of the device makes the transistors T1 and T2 conductive, the positive pulse memory flip-flop (MIP) is in the state where T6 is conductive, and T5 is blocked. The time base circuit consisting of the transistors T3 and T4 is in the state where T4 is blocked and T3, conductive, while the discharging of the capacitor C2 lasts, i.e., during a longer time than the sum of the duration of the positive pulse and the negative pulse.

The positive pulse (lasting 80 ms, for example) is succeeded by a negative pulse lasting 40 ms, for example. This negative pulse has no effect on the flip-flop MIP; indeed, the transistor T3, being conductive, cancels the voltage circuit through D2 and R2. The flip-flop MIP is held, therefore, in the state where T6 is conductive and T5, blocked. Inasmuch as concerns the flip-flop MIN, it has been seen, in case A, that the permanent negative voltage had placed that flip-flop in the state where T7 is conductive and T8 blocked. As in case B, the supply of the 80 ms positive pulse does not modify the state of MIN, where T7 remains conductive and T8 is blocked. But as soon as the negative pulse is supplied, the flip-flop (MIN) consisting of the transistors T7 and T8 changes its state; indeed, the shunting of the negative voltage across D4, R11 and R12 consequently makes the potential at the base of the transistor T8, which thus becomes conductive, more negative, the transistor T7 becoming blocked by the discharging or change of state of T8 across D19 and R35.

The negative pulse counting circuit consisting of a delay circuit associated with the transistor T9, is designed for counting only the negative pulses exceeding a certain duration, for example, $t2 > 20$ milliseconds. To do this, the transistor T8, having become conductive when the positive pulse was supplied, transmits, across the diode D23, a positive pulse whose effect is to cause the transistor T9 to remain blocked as long as the potential at the base of T9 remains greater than that at the emitter of T9 subsequent to the action of the delay circuit consisting of the capacitor C3 and the resistors R5 and R15.

This circuit enables all negative pulses smaller than $t2$ to be eliminated; indeed, if a positive telegraphic pulse is applied while T9 is blocked, the flip-flop MIN changes its state, T7 becoming conductive by a negative voltage across the transistor T2, the diode D3, the resistor R16 and the diode D5.

It is assumed, in this case, that the call is at 50 bauds, and not at 200 bauds, only the output SA becoming positive, since T7 blocks the transistor T10.

At the moment (80 + 40) ms which covers the duration of the two positive and negative pulses, the permanent positive telegraphic voltage comes back to the input E of the device. Successively, T1 and T2 become conductive; T2 supplies the resistors R10 and R17 across the diode D3, so as to make the transistors T10 and T11 conductive. The transistor T9 having become conductive again at the instant (80 + 20) ms, the shunting of the output current of T2 across R16 has no action on the base of the transistor T7. Therefore, the flip-flop MIN can no longer change its state. Nevertheless, the positive voltage coming from the transistor T3, which is still conductive, (the delay circuit of C2 being 150 ms), holds the transistors T11 and T10 provisionally blocked across D6 and D7. At the instant 150 ms, the transistor T3 becomes blocked; moreover, the flip-flop MIN, with T7 blocked and T8 conductive, holds the transistor T11 blocked independently of T3, so that only the transistor T10 is made conductive by the following circuit: the negative voltage, the transistor T2, the diode D3, the resistor R17, the Zener diode ZN3, the resistor R37 and the positive voltage. The transistor T10, being conductive, applies a positive voltage across the diodes D25 and D26 to the respective outputs SA and SR.

The output SA causes, in the line equipment, the operation of the call relay, which takes place whatever the type of call may be, 50 or 200 bauds; the output SR causes the operation of the rapid transmission relay which takes place only in the case of a call at 200 bauds.

In the embodiment of the invention shown in FIG. 2, relating to an application of the pulse discriminator device according to the present invention, in a telegraphic application, the discriminator device consists of the electronic circuits comprised in the square DI drawn in dash-dotted lines in the figure, the circuits, outside that square, being comprised in the subscriber's telegraphic line equipment.

The input E2 of the device DI is connected to the telegraphic channel A of a subscriber's line equipment, across a diode *d1a* at a common terminal of the anode of that diode and of a resistor R*a* whose opposite end is connected to the positive voltage of the supply source.

The outputs S2 and S3 of the device are connected to the terminals of the call relay AP of the subscriber's line equipment, this relay being, itself, connected, on the one hand, to the channel A across a diode *d2a*, and, on the other hand, to the positive polarity of the supply source, across a diode *d3a*. A diode *d4a* whose anode has a common terminal with the diode *d3a*, is connected to the terminals of the call relay.

The input E1 of the device is connected to a working contact ap of the call relay enabling the positive supply voltage to be applied to this input. The output S1 is connected to one end of a relay DC which records requests for rapid calls, the opposite end being connected to the negative supply voltage. A connection connects up the input E1 and the output S1 across a working contact dc of the relay DC, a diode *d5a* being, moreover, connected to the terminals of that relay, so that the anode of that diode is at negative supply voltage.

The device according to the invention consists of several circuits each of which assumes a determined function, namely:

A time constant circuit consisting of the input E1, a diode D1*a*, resistors R1*a*, R2*a*, a capacitor C, the emitter-base junction of a transistor T1*a*, a diode D2*a* and the positive supply voltage;

A clamping circuit consisting of the diode D2*a*, the transistor T1*a*, a resistor R3*a*, the input E2;

A detection circuit comprising the input E2, resistors R3*a* and R4*a*, the base of a transistor T2*a*;

A control circuit comprising the input E1, diodes D3*a*, D4*a*, the transistor T2*a* and, on the one hand, a diode D5*a* and the output S1; on the other hand, a diode D6*a* and the output S2;

A scanning circuit comprising resistors R5*a*, R6*a*, the emitter-base junction of a transistor T3*a* and the negative supply voltage;

A holding circuit, comprising a negative voltage, the transistor T3*a*, a resistor R7*a* and the output S3.

The positive and negative voltages mentioned are those of the 48-volt standard accumulator of the exchange, they are distinct from the positive and negative voltage of the telegraphic accumulator which is applied to the wire A of the subscriber's line equipment, this telegraphic accumulator being a 96-volt unit; the middle point of the telegraphic accumulator being grounded, the telegraphic positive is at +48 volts in relation to the positive of the standard accumulator which is also grounded. To avoid all confusion, the voltage belonging to the telegraphic accumulator will be described as "telegraphic" besides the reference to its sign.

The input E1 of the device according to the invention is connected, at the point X, to two circuits: the time constant circuit and the control circuit.

In the time constant circuit, the diode D1*a* is connected, on the cathode side, to the lower plate of a capacitor C, on the one hand, and, on the other hand, to the end of a resistor R1*a* whose opposite end is connected to the negative voltage; the upper plate of the capacitor is connected to the base of the (PNP) transistor T1*a* and to the end of a resistor R2*a* whose other end is at the negative voltage; the emitter of the transistor T1*a* is connected to the cathode of the diode D2*a* whose anode is at the positive voltage.

The last portion of the preceding circuit is also connected to the clamping circuit which extends across the base-collector junction of the transistor T1*a*, the point Y, the resistor R3*a* and the diode d1a whose anode is connected to the input E2.

The portion of the clamping circuit included between the input E2 and the point Y is also connected to the detection circuit which extends across the base of the (PNP) transistor T2*a*, this base being connected to the end of a resistor R4*a* whose opposite end is connected to the positive pole.

In the control circuit, the diode D3*a* is connected, on the cathode side, to the anode of the diode D4*a* whose cathode is connected to the emitter of the transistor T2*a;* the collector of the latter is connected, on the one hand, to the anode of the diode D5*a* whose cathode is connected to the output S1 and, on the other hand, to the anode of the diode D6*a* whose cathode is connected to the output S2 of the discriminator device.

The point Z connected to the collector of the transistor T2*a* is common to the control circuit and to the scanning circuit.

The scanning circuit, in parallel with the control circuit, comprises resistors R5*a* and R6*a* connected in series, the middle point of these resistors being connected to the base of the (NPN) transistor T3*a* and the end of the resistor R6*a* being connected to the negative voltage as well as to the emitter of the transistor T3*a*.

The annex circuit comprises the negative voltage, the transistor T3*a* whose collector is connected to the end of a resistor R7*a*, the other end of that resistor being connected to the output S3.

The terminal equipment, connected to the emitter end of the channel A, applies a negative telegraphic voltage to the wire A in a free state; the current thus generated is applied across the diode d1*a*, to the positive supply voltage, by two circuits, the one being the resistor R of the subscriber's equipment, and the other being the clamping circuit of the pulse discriminator device DI, this circuit comprising the input E2, the resistor R3*a*, the transistor T1*a* and the diode D2*a*.

Indeed, the transistor T1*a* is conductive, its base having a negative potential in relation to the emitter. The capacitor C is charged by the the circuit: the positive voltage, the diode D2*a*, the emitter-base junction of the transistor T1*a*, the capacitor C, the resistor R1*a* and the negative voltage.

As the diode *d2a* blocks the negative telegraphic voltage, the relay AP is not supplied, and remains at rest. As the positive supply voltage is not applied to the input E1 of the device, the transistors T2*a* and T3*a* are blocked. The device does not transmit any control to the outputs S1, S2, S3, and the relay DC also remains at rest.

Request for call at 50 bauds

The call at 50 bauds results in a permanent positive telegraphic voltage on the wire A, succeeding the negative free state voltage. As the voltage of that positive telegraphic voltage is higher than the positive supply voltage, the diode *d2a* becomes conductive, whereas the diode *d1a* becomes blocked. A current is then generated in the following circuit: wire A, diode *d2a*, relay AP, diode D3, and causes the operation of the relay AP.

The working contact ap of this relay applies a positive supply voltage to the input E1 of the device. The current, which is generated across the diode D1*a* and the resistor R1*a*, generates a positive voltage at the upper plate of the capacitor C which discharges across the resistor R2*a*. The transistor T1*a* is blocked during the whole time that the capacitor discharges.

As the diode *d1a* is blocked, no current crosses the resistors R3*a* and R4*a* and while T1*a* is blocked, the base of the transistor T2*a* is at the potential of the positive voltage connected to the resistor R4*a*. Through the input E1 of the device, the point X and, consequently, the emitter of the transistor T2*a* is at the positive potential and this transistor, whose emitter and base are at the same potential, remains blocked.

As the diode D6*a* blocks the positive telegraphic voltage, no voltage drop results across the resistors R5*a* and R6*a*, so that the transistor T3*a*, transistor, whose emitter and base are at the same potential, remains blocked.

After the discharging of the capacitor C, the transistor T1*a* becomes conductive again (base negative in relation to the emitter), but, as the diode d1a blocks the positive telegraphic potential of the wire A, the input E2 of the device is not supplied, and the transistor T1a does not supply any current. The transistor T2*a* remains blocked in the same conditions as when T1*a* was blocked. Consequently, the device does not supply any control at the outputs and the relay DC remains at rest. The relay AP remains in the operating state when the positive telegraphic voltage is applied independently of the call discriminator device.

Request for transmission at 200 bauds

This call is characterized by a positive telegraphic pulse (80 milliseconds, for example) succeeding the negative free state voltage, the positive pulse being followed by a negative pulse (40 milliseconds, for example) before the return of a permanent positive telegraphic voltage.

During the positive telegraphic pulse, the device acts as previously on a call at 50 bauds: indeed, as the discharging time of the capacitor C (150 milliseconds, for example) is calculated to be higher than the change-over time of the two pulses (80 + 40), this discharge is taking place and the transistor T1a is blocked when the negative telegraphic pulse is received on the wire A. This negative pulse is applied to the positive voltage, across the diode d1a and, on the one hand, to the resistor R, and on the other hand, to the resistors R3*a* and R4*a* of the detection circuit.

As soon as the negative pulse is applied, the voltage drop across the resistors R4*a* brings the point Y, and hence, the base of the transistor T2*a*, to a negative potential in relation to the emitter. As this transistor becomes conductive, a circuit is completed by the positive voltage, the working contact *ap*, the input E1, the diodes D3*a* and D4*a*, the transistor T2*a*, the diode D5*a*, the relay DC and the accumulator. The relay DC operates: its role is to communicate to the call establishing and charging rate units, the type of connection required.

The positive voltage applied to the collector of the transistor T2*a* (point Z) is completed also across the resistors R5*a* and R6*a* of the scanning circuit; the voltage drop in the resistor R6*a* polarizes the base of the (NPN) transistor T3*a* positively in relation to the emitter, thus making that transistor conductive.

The energizing of the control and scanning circuits (unblocking of the transistors T2*a* and T3*a*) is, of course, effected before the relay AP, which is not supplied by the line current (diode *d2a* blocking the negative pulse) is de-energized, the delay of this relay in becoming de-energized being increased by the shunt formed at its terminals by the diode *d4a*.

As the transistor T3*a* is conductive, a current is generated by the following circuit:

The negative voltage, the transistor T3*a*, the resistor R7*a*, the output S3, the relay AP, the output S2, the output D6*a* and the positive potential of the point Z. This circuit, thus energized during the time that the negative pulse lasts, ensures that the relay AP is held.

As the permanent positive telegraphic voltage succeeds, on the wire A, the negative telegraphic pulse, the relay AP is again directly supplied by the latter, across the diodes *d2a* and *d3a* and remains in the working position. As the diode d1a blocks the positive telegraphic voltage of the wire A, the terminal Y is connected to the positive potential of the resistor R4*a* and the transistor T2*a* becomes blocked, causing the transistor T3*a* to become blocked also.

The relay DC remains held by its working contact dc and the working contact ap of the relay AP, independently of the discriminator DI.

It is evident that it would not be going beyond the scope of the invention to invert the types of transistors and the diodes equipping the device according to the invention, as well as the polarities of the voltage which supplies the device and the polarity of the telegraphic voltage received.

The various diodes have a determining action on the operation of the device.

The role of the diodes *d1a* and *d2a* of the line equipment is known.

Of these diodes, the first enables the positive telegraphic potential (+TG) of the wire A to block the line resistor circuit (R), in order to keep the same value of positive or negative current in the channel, and the second enables the energizing of the call relay, while receiving negative telegraphic voltage, to be avoided.

The diode d3a blocks the positive supply polarity connected to its cathode in order to enable the relay AP to be held by the discriminator device while the negative telegraphic pulse (−TG) is being received on the wire A.

The diodes *d4a* and *d5a* avoid, in the device, the adverse effects of a voltage surge which is applied at the terminals of the call relay and of the discrimination relay, when the exciter circuit of these relays is switched off.

The diode D1*a* enables possible disturbances at the transistor T2*a* to be avoided when the capacitor is recharged.

The diode D2*a* blocks the reverse voltage, when the capacitor discharges, at the emitter-base junction of the transistor T1*a*.

The diodes D3*a* and D4*a* enable more efficient blocking of the transistor T2*a*.

At the output S1 of the device, the diode D5*a* blocks the positive potential of the holding circuit of the relay DC.

At the output S2 of the device, the diode D6*a* blocks the +TG when it is applied to the channel A.

The device which is the object of the invention can, to great advantage, be used for transmitting data, using the telecommunications network.

Of course, the invention is in no way limited to the embodiments described and illustrated, which have been given merely by way of example. More particularly, certain arrangements may be modified and certain means may be replaced by equivalent means without going beyond the scope of the invention.

I claim:

1. A pulse discriminator having an input and a pair of outputs for identifying a sequence of signals, the polarities of which may vary, particularly for an automatic telegraph exchange, receiving signals transmitted at different modulation rates comprising:

first means for receiving at said input said signals to be identified;

second means for detecting the polarity of said received signals;

third means responsive to said first and second means for storing the polarity of those received signals having a first predetermined polarity; and fourth means responsive to said third means and said second means for delivering a signal to one of said outputs only after said first predetermined polarity has been stored a first specified period of time.

2. A pulse discriminator according to claim 1, further including fifth means responsive to said second means for storing the polarity of those received signals having a second predetermined polarity; and sixth means response to said second means and said fifth means for delivering an output signal to both outputs of said pair of outputs only after said second predetermined polarity has been stored a second specified period of time.

3. A pulse discriminator according to claim 2, wherein said second means comprises a first delay circuit for preventing the storage of the polarity of said received signals until said first predetermined polarity has been continuously detected over a minimum time duration.

4. A pulse discriminator according to claim 3, wherein said fourth means includes a time base control circuit responsive to said third means for preventing the delivery of a signal to said one of said outputs for said first specified period of time after said third means has begun storing said first predetermined polarity.

5. A pulse discriminator according to claim 4, wherein said third means comprises a first flip-flop having one of its inputs connected to said first means and the other input connected to said second means, while having its outputs connected to said fifth means, and further having one of its outputs connected to said time base control circuit.

6. A pulse discriminator according to claim 5, wherein said time base control circuit includes a first transistor circuit coupled to said one of the outputs of said first flip-flop through a second delay circuit and further includes a second transistor circuit connected to and controlled by said first transistor circuit, whereby, upon the storage of said first predetermined polarity by said flip-flop, said first transistor will be cut off, thereby causing said second transistor to conduct, so as to provide an output inhibiting signal and, thus, prevent the delivery of a signal to one of said outputs until after said first predetermined period of time controlled by said second delay circuit.

7. A pulse discriminator according to claim 6, wherein said second means further includes a first biasing transistor circuit, the input of which is connected to said first delay circuit and the output of which is connected to said fourth means and said third means, whereby, upon the continuous detection of said first predetermined polarity over said minimum time duration, said first biasing transistor will deliver a trigger voltage to said third means and said fourth means.

8. A pulse discriminator according to claim 7, wherein said fourth means further includes an output control circuit comprising a first output transistor, one electrode of which is connected to one of said outputs, while another electrode of which is coupled to said second transistor of said time base control circuit and to the first biasing transistor of said second means, whereby, upon the elapse of said first specified period of time, said inhibiting signal will be withdrawn from said first output transistor and said trigger voltage will, thereby, bias said first output transistor, so as to deliver an output signal to said one of said outputs.

9. A pulse discriminator according to claim 8, wherein said fifth means comprises a second flip-flop having one of its inputs connected to both said first and third means, and the other of its inputs connected to both said second and third means, while having its outputs connected to said output control circuit and, further, having one of its inputs connected to said sixth means.

10. A pulse discriminator according to claim 9, wherein said sixth means comprises a negative pulse counting circuit, the input of which is connected to said one of said outputs of said second flip-flop through a third delay circuit and the output of which is connected to said other of the inputs of said second flip-flop, whereby said second flip-flop is prevented from delivering an output signal to both outputs of said pair of outputs until said second flip-flop has stored said second predetermined polarity for said second specified period of time.

11. A pulse discriminator according to claim 10, whereby said output control circuit further comprises a second output transistor, one electrode of which is connected to said pair of outputs, while another electrode of which is coupled to one of the outputs of said second flip-flop and to said second transistor of said time base control circuit, whereby, upon the elapse of said second specified period of time, said trigger voltage will be delivered to said second output transistor and, thereby, said second output transistor will deliver an output signal to said pair of outputs.

12. A pulse discriminator having an input and a pair of outputs for identifying a sequence of signals, the polarities of which may vary, particularly for an automatic telegraph exchange, receiving signals transmitted at different modulation rates comprising:

first means for receiving at said input said signals to be identified;

second means responsive to said first means for detecting the polarity of said received signals; and third means responsive to said second means and said first means for delivering a signal to a first of said outputs in response to a first predetermined polarity of said received signals, further including fourth means, responsive to said second means and said first means, for delivering a signal to a second of said pair of outputs in response to a second predetermined polarity of said received signals and, a first holding means, responsive to said second means and said fourth means, for maintaining the delivery of a signal to said first of said outputs upon the cessation of the detection of a signal having said first predetermined polarity and the subsequent detection of a signal having said second predetermined polarity by said second means.

13. A pulse discriminator according to claim 12, further including a second holding means for maintaining the delivery of a signal to said second of said outputs upon the cessation of the detection of a signal having said second predetermined polarity and the subsequent detection of a signal having said first predetermined polarity by said second means.

14. A pulse discriminator according to claim 12, wherein said third means concludes a first transistor circuit connected to said second means for preventing the delivery of a signal to said second of said pair of outputs by said fourth means.

15. A pulse discriminator according to claim 14, wherein said second means comprises a pair of diodes connected to said first means, one of said diodes being connected to pass received signals having a first predetermined polarity and the other of said diodes being connected to pass received signals having a second predetermined polarity.

16. A pulse discriminator according to claim 15, wherein one side of said first transistor circuit is connected to said second diode and another side of said first transistor circuit is switchably connected to an energizing source for controlling the operation of said first transistor circuit in response to the detection of a signal having said first predetermined polarity by said second means.

17. A pulse discriminator according to claim 16, wherein said fourth means includes a second transistor circuit connected to said second diode and to said first transistor circuit for delivering a signal to said first holding circuit in response to the detection by said second means of a signal having said second predetermined polarity, whereby said first holding circuit will maintain the delivery of a signal to said first output of said pair of outputs.

18. A pulse discriminator according to claim 17, wherein said first holding circuit comprises a third transistor circuit responsive to the operation of said second transistor circuit, whereby upon the cessation of a signal having said first predetermined polarity and the subsequent detection of a signal having said second predetermined polarity, by said second means, said second transistor circuit will conduct, thereby, causing said third transistor circuit to conduct so as to maintain the delivery of an output signal to said first output.

19. A pulse discriminator according to claim 18, wherein said first output comprises a call relay circuit.

20. A pulse discriminator according to claim 18, wherein said second output comprises a self locking rapid call relay.

* * * * *